US011272455B2

United States Patent
Patwardhan et al.

(10) Patent No.: US 11,272,455 B2
(45) Date of Patent: Mar. 8, 2022

(54) DYNAMIC FREQUENCY SELECTION FOR WAKE UP RADIO

(71) Applicant: Hewlett Packard Enterprise Development LP, Houston, TX (US)

(72) Inventors: Gaurav Patwardhan, Santa Clara, CA (US); Eldad Perahia, Park City, UT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/902,412

(22) Filed: Jun. 16, 2020

(65) Prior Publication Data

US 2021/0392581 A1 Dec. 16, 2021

(51) Int. Cl.
| | | |
|---|---|---|
| *H04J 3/08* | (2006.01) | |
| *H04W 52/02* | (2009.01) | |
| *H04B 17/318* | (2015.01) | |
| *H04W 16/14* | (2009.01) | |
| *H04W 84/12* | (2009.01) | |

(52) U.S. Cl.
CPC ...... *H04W 52/0229* (2013.01); *H04B 17/318* (2015.01); *H04W 16/14* (2013.01); *H04W 84/12* (2013.01)

(58) Field of Classification Search
CPC ..... H04W 16/00; H04W 16/18; H04W 24/02; H04W 72/0406; H04W 84/042; H04W 88/005; H04W 88/08; H04W 88/085; H04W 4/06; H04W 4/70; H04W 4/80; H04W 52/0216; H04W 52/0229; H04W 52/0274; H04W 84/12; H04W 48/18; H04W 88/06; H04W 8/22

USPC ...... 370/329, 311, 338, 254, 252, 235, 294, 370/328, 255
See application file for complete search history.

(56) References Cited

U.S. PATENT DOCUMENTS

| | | | | |
|---|---|---|---|---|
| 7,158,805 B1 * | 1/2007 | Park | ...... | H04W 88/02 455/414.1 |
| 7,664,464 B2 * | 2/2010 | Gerstenkorn | ...... | G07C 9/00309 455/41.2 |

(Continued)

OTHER PUBLICATIONS

Aboul-Magd et al., "A CSD Proposal for Wake-up Radio (WUR)", IEEE 802.11-16/0936r4, Jul. 24, 2016, 6 pages.

(Continued)

*Primary Examiner* — Joseph Arevalo
(74) *Attorney, Agent, or Firm* — Jaffery Watson Mendonsa & Hamilton

(57) ABSTRACT

Embodiments are directed to dynamic frequency selection (DFS) for wake up radio (WUR). An embodiment of a storage medium includes instructions to cause operations including select, by a primary access point (AP), a surrogate AP to communicate with a wake up radio of a station that is associated with the primary AP operating on a Dynamic Frequency Selection (DFS) channel; provide, by the primary AP to the surrogate AP, wake up radio parameters negotiated between the station and the primary AP; cause, by the primary AP, the surrogate AP to send a wake up signal to the station, the wake up signal to cause the wake up radio of the station to enable a primary connectivity radio of the station; and exchange, by the primary AP, data with the station via the primary connectivity radio after the primary connectivity radio is enabled.

17 Claims, 10 Drawing Sheets

(56) References Cited

U.S. PATENT DOCUMENTS

| | | | |
|---|---|---|---|
| 9,299,053 B2* | 3/2016 | Gazdzinski | G06Q 20/204 |
| 10,911,906 B2* | 2/2021 | Kane | H04L 67/1097 |
| 2007/0066395 A1* | 3/2007 | Harris | A63F 13/358 |
| | | | 463/39 |
| 2016/0174626 A1* | 6/2016 | Mazzarolo | H04M 1/72421 |
| | | | 2/455 |
| 2020/0077335 A1* | 3/2020 | Perahia | H04W 52/0229 |
| 2021/0185597 A1* | 6/2021 | Chitrakar | H04W 52/0216 |

OTHER PUBLICATIONS

Park et al., "A PAR Proposal for Wake-up Radio", IEEE P802.11, Wireless LANs, Jul. 28, 2015, 5 pages.
Park et al., "Proposal for Wake-Up Receiver (WUR) Study Group", IEEE 802.11-16/0722r1, Intel Corporation, May 2016, 14 pages.
Po-Kai Huang, "Specification Framework for TGba", IEEE 802.11-17/0575r11, Mar. 26, 2018, 18 pages.
Yu et al., "WUR Usage Model Document", IEEE 802.11-17/0029r10, Sep. 13, 2017, 23 pages.

* cited by examiner

600

Select, by a primary access point (AP), a surrogate AP to communicate with a wake up radio of a station that is associated with the primary AP operating on an 802.11 Dynamic Frequency Selection (DFS) channel, where the surrogate AP is operating on a non-DFS channel
610

Provide, by the primary AP to the surrogate AP, wake up radio parameters negotiated between the station and the primary AP
620

Cause, by the primary AP, the surrogate AP to send a wake up signal to the station, the wake up signal to cause the wake up radio of the station to enable a primary connectivity radio of the station
630

Exchange, by the primary AP, data with the station via the primary connectivity radio after the primary connectivity radio is enabled
640

FIG. 6

DYNAMIC FREQUENCY SELECTION FOR WAKE UP RADIO

BACKGROUND

In computer networking, a wireless Access Point (AP) is a networking hardware device that allows a Wi-Fi compliant client device to connect to a wired network and to communicate with other client devices directly over Wi-Fi. The AP usually connects to a router (directly or indirectly via a wired network) as a standalone device, but it can also be an integrated component of the router itself. Several APs may also work in coordination, either through direct wired or wireless connections, or through a central system, commonly called a Wireless Local Area Network (WLAN) controller.

To reduce Wi-Fi power consumption, an IEEE 802.11ba amendment proposes adding a second low-cost, ultra-low power receive-only radio, referred to as the wake up radio (WUR), alongside the main Wi-Fi radio, referred to as the primary connectivity radio (PCR). The WUR is enabled while the primary connectivity radio is disabled. On receiving a wake up radio signal (WURS) from an access point (AP), the WUR wakes the PCR so that normal IEEE 802.11 communication can take place between the access point and the device. As such, the WUR enables ultra-low power Wi-Fi operation with low latency.

Dynamic Frequency Selection (DFS) may be applied in Wi-Fi networks. DFS is a mechanism that allows wireless devices (e.g., stations (STAs)) to use 5 GHz frequency bands or channels without causing interference to radar systems or other services that are allocated in those channels. Using DFS, the AP(s) in the Wi-Fi network can automatically select frequency channels with low interference levels. DFS is mandated in the 5 GHz band for purposes of radar avoidance.

BRIEF DESCRIPTION OF THE DRAWINGS

Embodiments described here are illustrated by way of example, and not by way of limitation, in the figures of the accompanying drawings in which like reference numerals refer to similar elements.

FIG. 6 illustrates operations for DFS for WUR, according to some embodiments.

DETAILED DESCRIPTION

Figure 1:
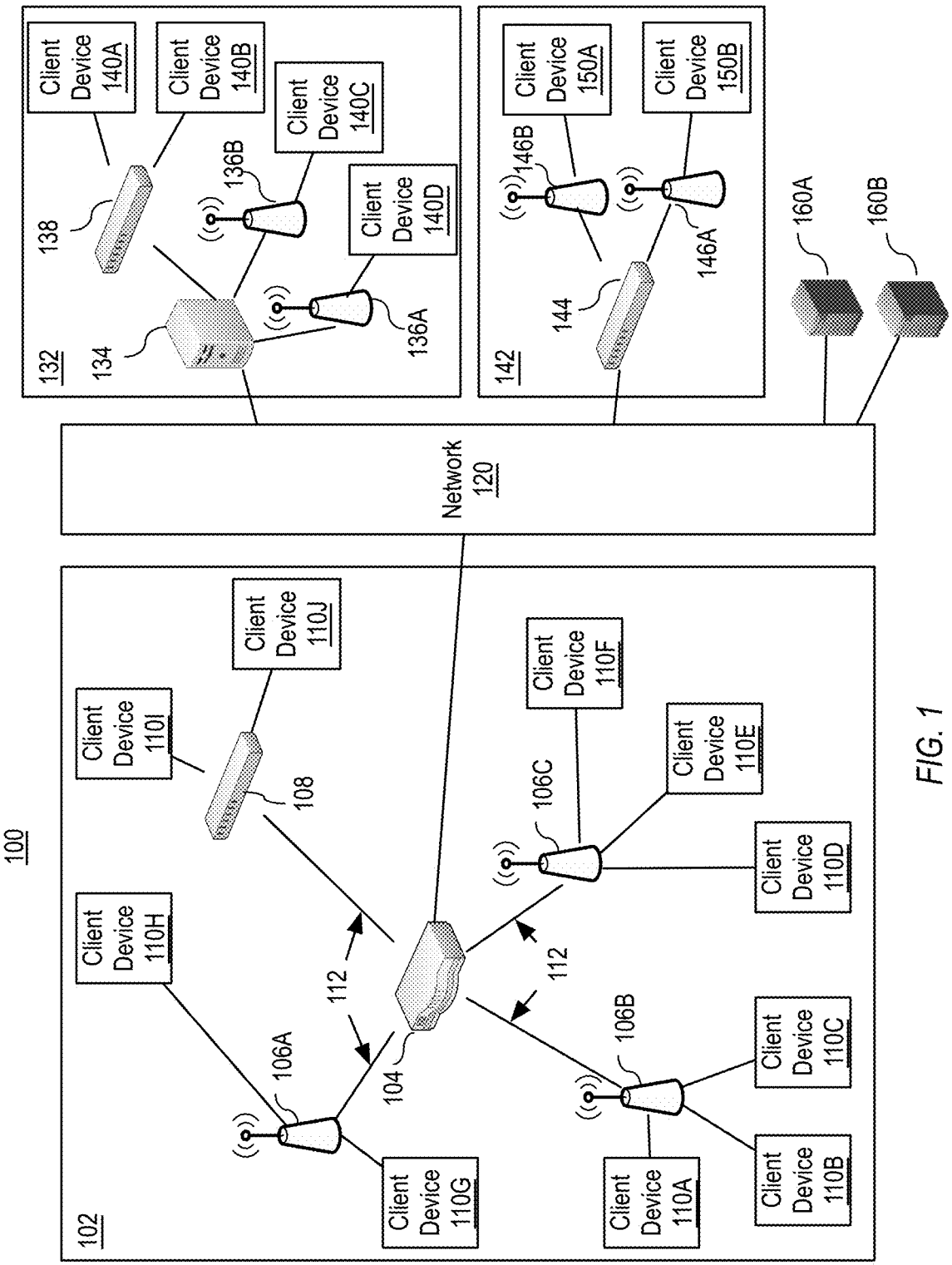
FIG. 1 illustrates a network configuration for dynamic frequency selection (DFS) for wake-up radio (WUR) according to some embodiments.

Embodiments described herein are directed to a dynamic frequency selection (DFS) for wake-up radio (WUR). To reduce Wi-Fi power consumption, an IEEE 802.11ba amendment proposes adding a second low-cost, ultra-low power receive-only radio, referred to as the wake up radio (WUR), alongside the main Wi-Fi radio, referred to as the primary connectivity radio (PCR). The WUR is enabled while the primary connectivity radio is disabled. On receiving a wake up radio signal (WURS) from an access point (AP), the WUR wakes the PCR so that normal IEEE 802.11 communication can take place between the access point and the device. As such, the WUR enables ultra-low power Wi-Fi operation with low latency.

Unfortunately, the WURS specified by the amendment closely resembles a radar signal and so may trigger dynamic frequency selection (DFS) in DFS channels. DFS is a spectrum-sharing mechanism that allows Wi-Fi access points (APs) to coexist with radar systems in the 5 GHz band. When operating on a channel with DFS in place, an AP should detect radar systems operating at the same frequency and change to a different channel when such radar systems are detected. When a radar system is operating on a Wi-Fi channel, the radar system causes a series of radio frequency (RF) pulses that the Wi-Fi radio chipset reports to the AP driver. The AP driver can then identify the radar based on the known patterns of the radar systems.

When the WURS triggers DFS in DFS channels, Wi-Fi radios are mandated to vacate the affected DFS channel for a significant interval, currently set at 30 minutes. For this reason, the IEEE 802.11ba standard does not allow the use of the WURS in DFS channels. But the use of DFS channels is highly desirable to minimize interference between access points, especially in large deployments such as large enterprises, warehouses, and in outdoor applications such as in stadiums and the like.

In implementations of the disclosed technology, a system or process is to provide for DFS for WUR. In some embodiments, WUR functionality is enabled for APs operating on DFS channels. As noted above, the specification for WUR in the IEEE 802.11 standard states that an AP operating on a DFS channel cannot support WUR functionality in the 5 GHz band. This lack of support for WUR on APs on DFS channels can be problematic in high density deployments of APs, which rely on deploying APs that operate solely on DFS channels.

Implementations of the disclosure provide techniques for primary AP operating on a DFS channel in the 5 GHz band to select a surrogate AP that is a neighbor of the primary AP, where the surrogate AP is operating on a non-DFS channel. The primary AP can negotiate WUR parameters with a station associated with the primary AP and provide channel information of the surrogate AP to the station for purposes of WUR operation. The negotiated WUR parameters may then be provided by the primary AP to the surrogate AP. When the station is in sleep mode and a packet destined for the station is received at the primary AP, the primary AP can cause the surrogate AP to send a wake up signal to the station (using the WUR parameters). Once the primary connectivity radio of the station is awake, the station can then communicate with the primary AP.

Implementations of the disclosure operate by selecting, by a primary access point (AP), a surrogate AP to communicate with a wake up radio of a station that is associated with the primary AP operating on an 802.11 Dynamic Frequency Selection (DFS) channel, where the surrogate AP is operating on a non-DFS channel; providing, by the primary AP to the surrogate AP, wake up radio parameters negotiated between the station and the primary AP; causing, by the primary AP, the surrogate AP to send a wake up signal to the station in response to the primary AP receiving a packet destined for the station, the wake up signal to cause the wake up radio of the station to enable a primary connectivity radio of the station; and exchanging, by the primary AP, data with the station via the primary connectivity radio after the primary connectivity radio is enabled.

As a result, implementations of the disclosure can reduce the number of false radar detection, increase network usability and stability of the AP, improve detection of false versus real radar signals at the AP, reduce cost associated with engineering time on false detection of radar signals, and improve large scale and dense deployments of APs.

FIG. 1 illustrates one example of a network configuration 100 in which dynamic radar detection threshold for stateful DFS of implementations of the disclosure might be implemented. FIG. 1 illustrates an example of a network configuration 100 implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106A-C. Switches 108 and wireless APs 106A-C provide network connectivity to various client devices 110A-J. Using a connection to a switch 108 or AP 106A-C, a client device 110A-J may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (TOT) devices, and the like.

Within the primary site 102, a switch 108 is included as one example of a point of access to the network established in primary site 102 for wired client devices 110I-J. Client devices 110I-J may connect to the switch 108 and through the switch 108, may be able to access other devices within the network configuration 100. The client devices 110I-J may also be able to access the network 120, through the switch 108. The client devices 110I-J may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110A-H. Each of APs 106A-C may be a combination of hardware, software, and/or firmware that is configured to provide wireless network connectivity to wireless client devices 110A-H. In the illustrated example, APs 106A-C can be managed and configured by the controller 104. APs 106A-C communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or APs 136A-136B in communication with the gateway device 134 over either wired or wireless connections. The switch 138 and APs 136A-136B provide connectivity to the network for various client devices 140A-D.

In various embodiments, the remote site 132 may be in direct communication with primary site 102, such that client devices 140a-d at the remote site 132 access the network resources at the primary site 102 as if the client devices 140a-d were located at the primary site 102. In such embodiments, the remote site 132 is managed by the controller 104 at the primary site 102, and the controller 104 provides the connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising a gateway device 144 for communicating with the network 120 and wireless APs 146A-146B, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 132, 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160A-B include, for example, web servers, streaming radio and video providers, and cable and satellite television providers. The client devices 110A-J, 140A-D, 150A-B may request and access the multimedia content provided by the content servers 160A-B.

In implementations of the disclosure, APs 106A-C, 136A-B, 146A-B may implement DFS for WUR by selecting a neighboring AP to act as a surrogate for the AP (the primary AP) for purposes of WUR communications with a station. Further description of DFS for WUR by APs 106A-C, 136A-B, 146A-B is described with respect to FIGS. 2-9 below.

Figure 2:
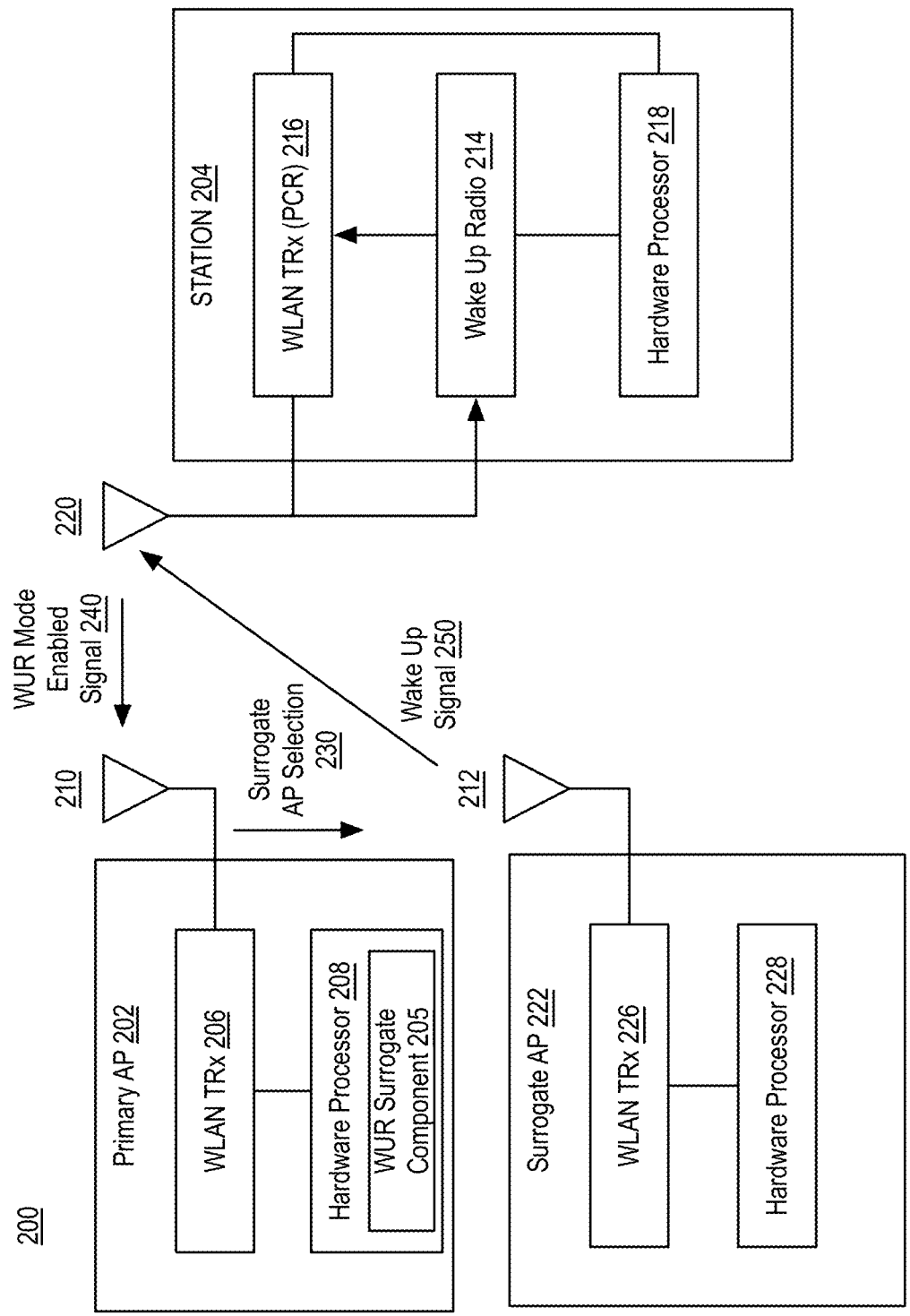
FIG. 2 illustrates a communications system for DFS for WUR according to some embodiments.

FIG. 2 depicts a communications system 200 in accordance with one embodiment. In the example implementation of FIG. 2, the communications system 200 includes a primary access point (AP) 202, a surrogate AP 222, and a station 204. The primary AP 202 and surrogate AP 222 may be any device capable of executing the functions of an access point. For example, the primary AP 202 or surrogate AP 222 may be implemented as an off-the-shelf device, as a smartphone acting as a hotspot, as a dedicated hotspot device, and the like.

The primary AP 202 includes a wireless local-area network (WLAN) transceiver (TRx) 206 and one or more antennas 210. The WLAN TRx 206 may be any one of, but is not limited to, an IEEE 802.11ax transceiver, an 802.11ac transceiver, an 802.11n transceiver, or an 802.11a transceiver, to name a few examples. The primary AP 202 may include a hardware processor 208 and associated hardware to perform functions described herein for the primary AP 202. For example, the hardware processor 208 may include a WUR surrogate component 205 capable of performing the functions described herein for DFS for WUR.

The surrogate AP 222 includes a WLAN TRx 226 and one or more antennas 212. The WLAN TRx 226 may be an IEEE 802.11ax transceiver. The surrogate AP 222 may include a hardware processor 228 and associated hardware to perform functions described herein for the surrogate AP 222.

The station 204 includes a WLAN TRx 216, a WUR 214, and one or more antennas 220. The WLAN TRx 216 may be an IEEE 802.11ax Primary Connectivity Radio (PCR). The WUR 214 may conform to IEEE 802.11ba. The station 204 may include a hardware processor 218 and associated hardware to perform functions described herein for the station 204. In one implementation, the station can be referred to as a node, a client device, a mobile device, or a user device, to name a few examples.

In operation, primary AP 202 may be operating on a 5 GHz DFS channel. As a result, primary AP 202 is cannot support WUR functionality and performs (e.g., via WUR surrogate component 205) a surrogate AP selection process 230. Primary AP 202 transmits communications 230 to the surrogate AP 222 as part of the AP selection process. Station 204 may be in communication with primary AP 202 and subsequently enters a WUR mode. Station 204 may communicate the enablement of the WUR mode at station 204 via a WUR mode enabled signal 240 that is transmitted to the primary AP 202. Surrogate AP 222 can transmit a wake up signal 250 to the station 204 on primary AP's 202 behalf in response to a packet being received for the station 204 at the primary AP 202. In this case, the primary AP 202 can cause the surrogate AP 222 to communicate the wake up signal 250 to the station 204 to cause the station 204 to enable the PCR 216 for communications with the primary AP 202. FIGS. 3, 4, 5A, and 5B show further details for the DFS for WUR according to various embodiments.

The quantity of devices and/or networks illustrated in FIGS. 1 and 2 is provided for explanatory purposes. In practice, network configuration 100 and/or system architecture 200 may include additional devices and/or networks; fewer devices and/or networks; different devices and/or networks; or differently arranged devices and/or networks than illustrated in FIGS. 1 and 2. For example, while not shown, network configuration 100 may include devices that facilitate or enable communication between various components shown in network configuration 100, such as routers, modems, gateways, switches, hubs, etc.

Figure 3:
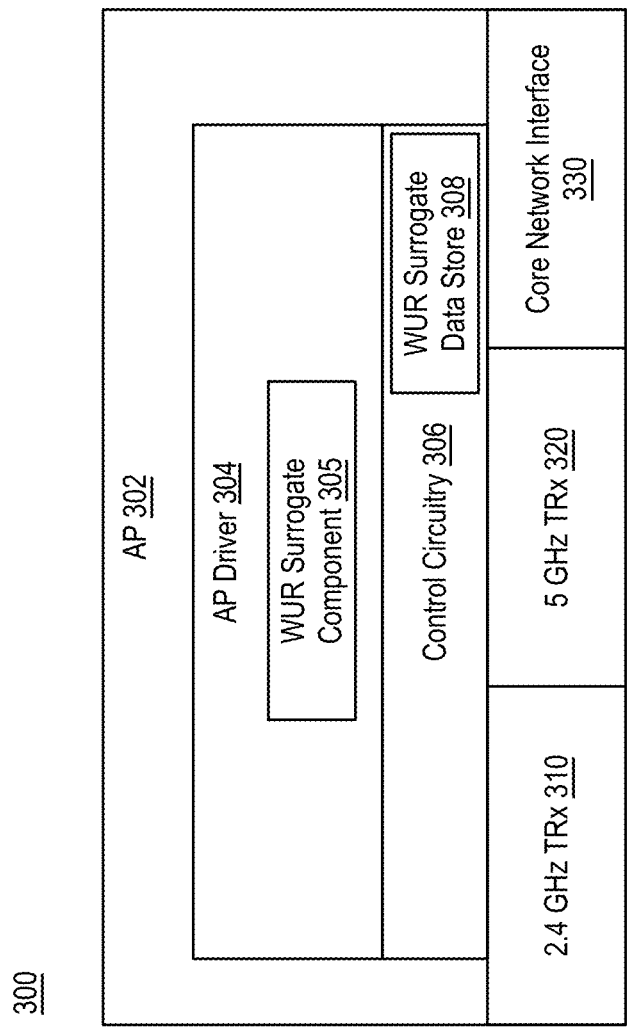
FIG. 3 illustrates a system architecture for DFS for WUR according to some embodiments.

FIG. 3 illustrates a system architecture of an access point 300 implementing DFS for WUR, according to some implementations. In one implementation, AP 300 may be an example embodiment of one of APs 106a-c, 136, 146 described with respect to FIG. 1 and/or APs 202, 222 described with respect to FIG. 2.

As illustrated, AP 300 may include an AP driver 304, control circuitry 306, 2.4 GHz transceiver (TRx) 310, 5 GHz transceiver 320, and core network interface 330. Control circuitry 306 may include one or more processors, Application Specific Integrated Circuits (ASICs), and/or memories that execute one or more software or firmware programs, a combinational logic circuit, and/or other suitable software or hardware components. In some embodiments, the control circuitry may be implemented in, or functions associated with the control circuitry may be implemented by, one or more software or firmware modules. In some embodiments, the control circuitry may include logic, at least partially operable in hardware. The memory may include, for example, a computer-readable medium, which may be a non-transitory computer-readable medium. The computer-readable medium may store processor-executable instructions that, when executed by control circuitry 306, may control the implementation of certain aspects of the functionality described herein. Control circuitry 306 may generally control the operation of AP 300. Control circuitry 306 may operate to execute functionality of AP driver 304.

The 2.4 GHz transceiver 310 and the 5 GHz transceiver 320 may include radio frequency (RF) circuitry and/or antennas for communicating in the 2.4 GHz and 5 GHz unlicensed bands, respectively. The 5 GHz transceiver 320 may include circuitry for measuring and/or listening for the presence of devices associated with a radar system (e.g., listening for the presence of radar pulses).

Core network interface 330 may include circuitry to implement a physical interface with a network, such as network 120 described with respect to FIG. 1. In one embodiment, core network interface 330 may connect to network using a wired interface (e.g., an Ethernet cable, a fiber link, etc.). Alternatively, or additionally, core network interface 330 may provide a wireless interface to network, such as via a microwave link, a cellular radio link, or other wireless link. In some embodiments, the core network interface 330 may be disconnected. For example, AP 302 may be an "inbuilt" media server capable of streaming video to wireless devices while not connected to the Internet.

In one implementation, control circuitry 306 may operate to execute functionality of AP driver 304 that implements a WUR surrogate component 305. The WUR surrogate component 305 may implement DFS for WUR in accordance with implementations of the disclosure. In some implementations, the WUR surrogate component 305 may also be referred to as WUR surrogate code. In some implementations, WUR surrogate component 305 is the same as WUR surrogate component 205 described with respect to FIG. 2.

In some embodiments, the WUR surrogate component 305 provides for surrogate AP selection as part of implementing DFS for WUR when the AP 300 is operating on a channel with DFS rules in place (referred to herein as a DFS channel). As previously discussed, the IEEE 802.11ba amendment provided for adding a second low-cost, ultra-low power receive-only radio to operating stations (STA), such as station 204 described with respect to FIG. 2. The receive-only radio is referred to as the wake up radio (WUR) and operates alongside the main Wi-Fi radio, referred to as the primary connectivity radio (PCR). The WUR is enabled while the PCR is disabled. On receiving a wake up radio signal (WURS) or a Wake-Up Packet (WUP) from an access point (AP), the WUR wakes the PCR so that normal IEEE 802.11 communication can take place between the AP and the station.

As such, the WUR enables ultra-low power Wi-Fi operation with low latency. The power savings for the WUR when compared to PCR come from the 4 MHz operational bandwidth. The WUR's main purpose is to wake up the PCR on the STA when it receives the WURS or WUP sent by the AP. The WUR can operate in 2 primary modes: 1. Always On: The WUR Rx remains ON all the time; or 2. Duty-cycled mode: The WUR Rx operates in a duty-cycled mode, in which it is ON for a certain duration and in a doze state for the rest of the duty cycle.

Although the main function of the WUR is to receive the WUP and wake up the PCR, a few other packets sent by the AP should be heard and processed by the WUR to maintain certain desirable states for its working. One of these packets is the beacon packet that is periodically sent by the AP and used for timing synchronization function (TSF) at the station. Another of these packets is the discovery frame packet that is periodically sent by the AP and used by the station to discover the different basic service sets (BSSs).

A single AP, such as AP 302, can send both of these frames on different 20 MHz channels (in traditional 802.11 parlance) and with different periodicity. After the PCR (of a station) associates to the AP 302 through the normal 802.11 association phase, the WUR's operating parameters are negotiated through the existing 802.11 Action frame exchange. This process is called the "WUR Negotiation Phase". These parameters include, but are not limited to, the WID, GID, duty cycle operation parameters, etc. After negotiating the parameters for the WUR operation, the station may choose to go to the sleep mode based on various conditions. The WUR in this state operates in one of the 2 primary modes mentioned above (i.e., Always ON or Duty-cycled) until it receives a WUP and consequently wakes up the PCR.

In one example, there may be two APs operating on a DFS channel. The WUP sent by one AP is mistaken by the other AP for a radar pulse since the WUP is 4 MHz wide. For this reason, the IEEE 802.11ba standard does not allow the use of the WURS in DFS channels and states that an AP operating on the DFS channel does not support WUR functionality in 5 GHz band. This leads to the possible scenarios depicted in Table 1 below:

TABLE 1

Operational Scenarios of an AP

| 2.4 GHz active? | 5 GHz sub-band used | 5 GHz second radio active? | WUP Band Choice | Comment |
|---|---|---|---|---|
| Yes | Non-DFS | No | 2.4 or 5 GHz | WUP and Data on any band |
| Yes | DFS | No | 2.4 GHz | WUP and Data on different bands |
| No | Non-DFS | No | 5 GHz | WUP and Data on same band |
| No | DFS | No | ? | ? |
| No | DFS | Non-DFS | Second 5 GHz | WUP and Data on different bands |

As shown in Table 1, there is a problematic scenario encountered when an AP does not have the 2.4 GHZ band active and also utilizes a 5 GHz DFS sub-band. Support for WUR functionality is not allowed by the 802.11 standard in this case. This is not a feasible approach to a scaled deployment as there is no solution for the case as shown in the last row of Table 1. For a high density network deployment, often the 2.4 GHz radios are either switched off or in some type of monitoring mode. This is because 2.4 GHz has 2× the range of 5 GHz and there are considerably less (3 nonoverlapping) channels in 2.4 GHz compared to 5 GHz which has 12 channels (40 MHz bandwidth in US regulatory list). In a typical large-scale deployment, one out of every seven APs' 2.4 GHz radio can be turned ON. This results in 6 out of 7 APs in a large-scale or dense deployment having their 2.4 GHz radio off and potentially operating on a DFS channel in the 5 GHz band, resulting in the problematic scenario highlighted in Table 1 above.

Implementations of the disclosure address the above-noted problem by providing for DFS for WUR for an AP operating on a DFS channel. In one implementation, WUR surrogate component 305 may implement DFS for WUR via AP driver 304 as described in further detail below and with further respect to FIGS. 4-9.

In implementations of the disclosure, DFS for WUR may be implemented as follows. An AP1 (such as AP 302 if FIG. 3) is operating on a DFS channel (e.g., 2.4 GHz radio is turned OFF on this AP in accordance with the above topology). AP2 is a neighbor AP of AP1 and operating on a non-DFS channel in 5 GHz. (e.g., 2.4 GHz radio may or may not be operational), such that AP2 can receive a station's (e.g., STA1) Probe Requests. A WUR-capable STA (e.g., say STA1) associates to AP1 and does a WUR negotiation on the PCR. AP1 negotiates with STA1, the AP2's 2.4 GHz/5 GHz operational channel as the channel to receive the WUP.

AP2 is also within the reach of STA1. AP1 shares the WUR negotiation parameters (including wake-up ID (WID), group ID (GID), etc.) with AP2. When a packet to be sent to STA1 is received from the Distribution System (IEEE 802.3 for example), AP1 signals AP2 to wake up STA1. AP2 sends WUP to STA1 and STA1 resumes its PCR working with AP1. In one implementation, AP1 can also signal AP2 to wake up STA1 in response to an operational change to the basic service set (BSS) parameters at AP1.

Table 1 above also depicts a scenario where the AP uses two 5 GHz radios, instead of one 2.4 GHz radio and one 5 GHz radio. In that case, one of the 5 GHz radios may be operating on a DFS channel while the other 5 GHz radio is not operating on a DFS channel. In implementations of the disclosure, DFS for WUR as described above may also be implemented within the single AP by using the non-DFS 5 GHZ radio as the surrogate for the DFS 5 GHz radio of the AP.

Figure 4:
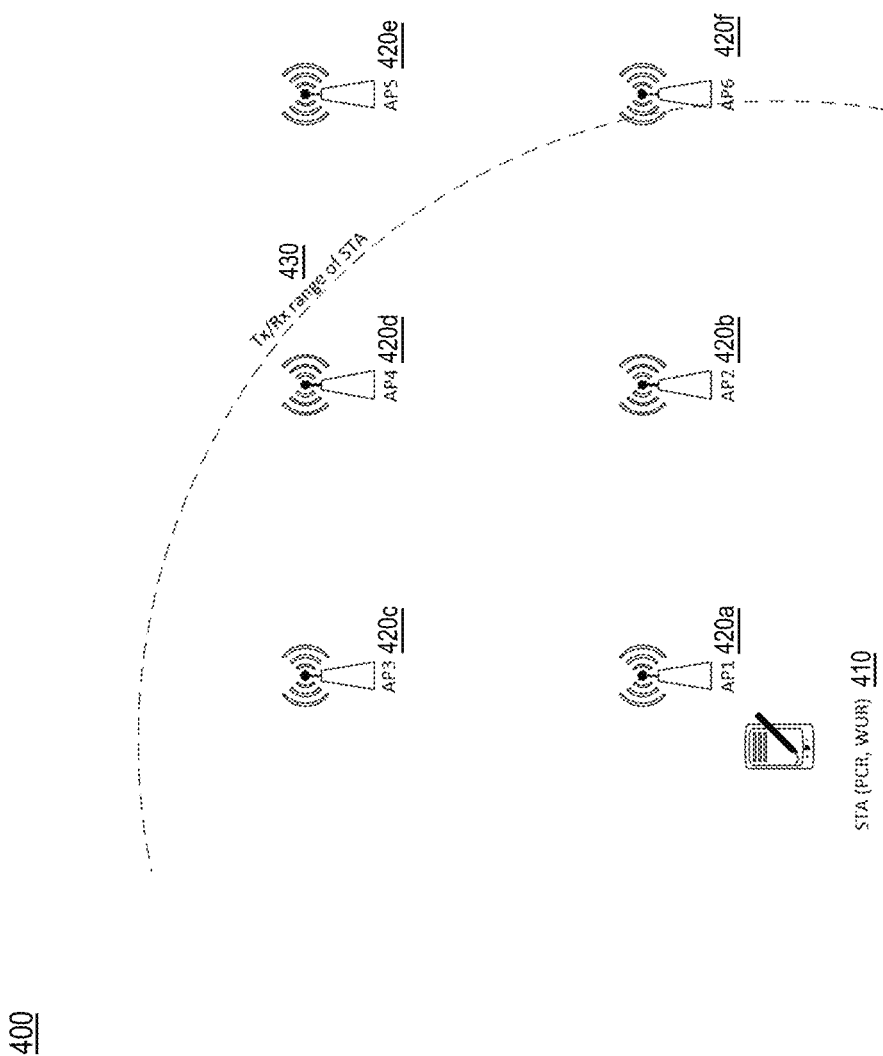
FIG. 4 depicts an example communication deployment implementing DFS for WUR according to some embodiments.

FIG. 4 is an example system architecture implementing DFS for WUR according to some embodiments. System architecture 400 includes a station 410 including a PCR and WUR in communication with a deployment of APs 420a-420f. In one implementation, station 410 may be the same as station 204 described with respect to FIG. 2. In one implementation, APs 420a-420f may be the same as APs 106a-c, 136, 146 described with respect to FIG. 1, APs 202, 222 described with respect to FIG. 2, and/or AP 300 described with respect to FIG. 3. As shown in FIG. 4, a subset of APs 420a-420f are included in a Tx/Rx range 430 of the station 410. The APs in the subset include AP1 420a, AP2 420b, AP3 420c, and AP4 420d.

With respect to the AP deployment depicted in system architecture 400, the following example operational parameters may exist for the APs 420a-420d in the TX/Rx range 430 of STA 410 for purposes of the following explanatory description. Other operational parameters and deployments are envisioned for implementations of the disclosure and are not limited to the particular depiction of FIG. 4. The example operational parameters may include: 1. AP1: 2.4 GHz non-operational, 5 GHz operating on DFS channel; 2. AP2: 2.4 GHz operational, 5 GHz on non-DFS channel; 3. AP3: 2.4 GHz operational, 5 GHz on DFS channel; and 4. AP4: 2.4 GHz operational, 5 GHz on non-DFS channel.

Using DFS for WUR as implemented by a WUR surrogate component 305, any APs 420a-420f that are operating on DFS channel in 5 GHz with their 2.4 GHz radio non-operational can select a surrogate AP based on a neighborhood graph of the particular AP 420a-420f. For example, AP1 420a would have AP2 420b, AP3 420c and AP4 420d within its neighborhood graph. The neighborhood graph may appear similar to Table 2 below.

TABLE 2

Neighborhood Graph of AP1 420a

| AP | Surrogate 2.4 GHz radio? | Surrogate 5 GHz radio? |
|---|---|---|
| AP2 420b | Yes | Yes |
| AP3 420c | Yes | No |
| AP4 420d | Yes | Yes |

As shown in the neighborhood graph of AP1 420a reflected in Table 2, the 5 GHz radio of AP3 420c is on a DFS channel. As such, AP3 420c cannot act as a surrogate radio to AP1 420a and is removed from consideration as a surrogate AP for AP1 420a. This is the first part of the surrogate AP selection process in implementations of the disclosure.

Figure 5A:
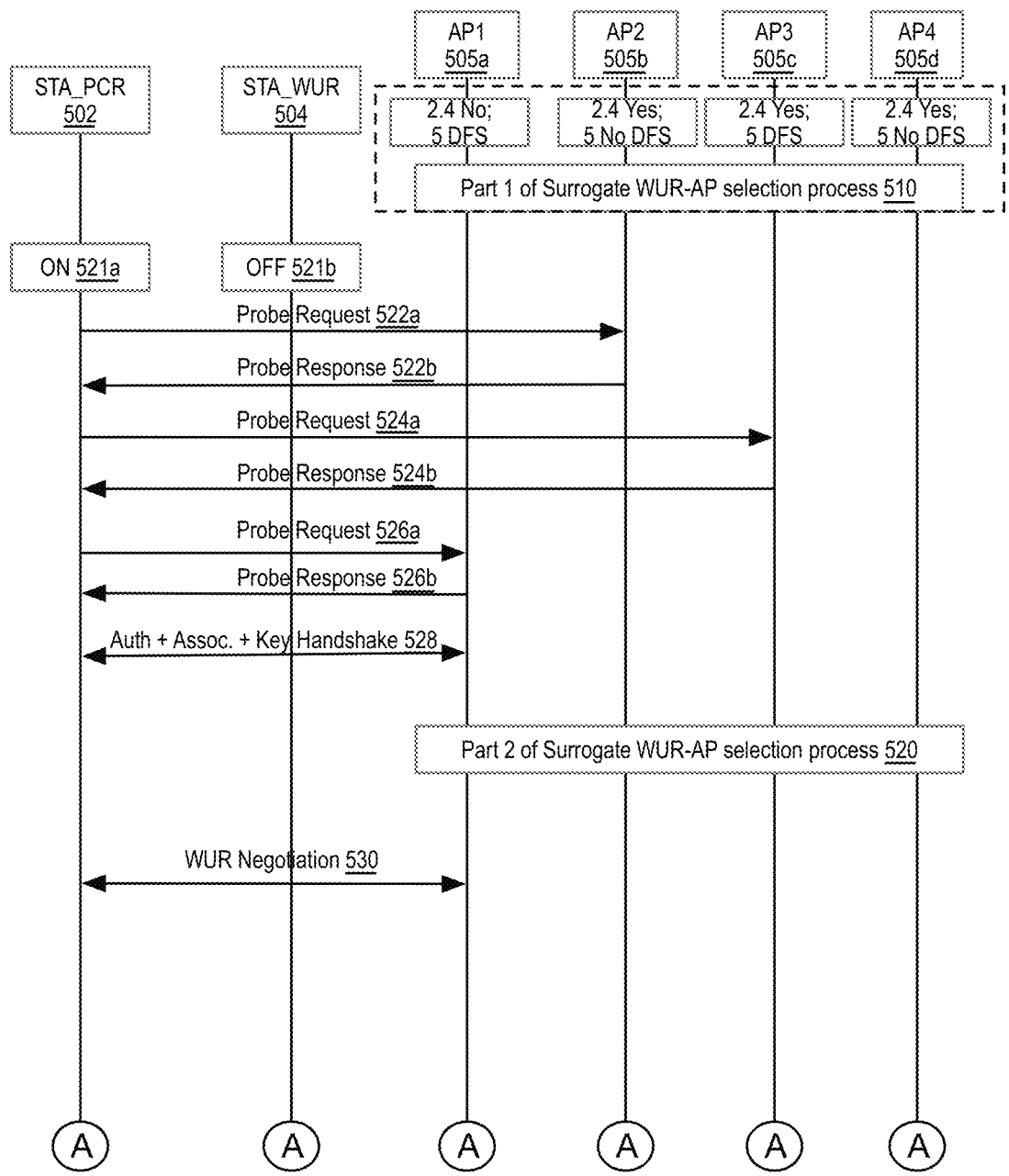
FIGS. 5A and 5B depict an example schematic flow of DFS for WUR in a communication deployment according to some embodiments.
Figure 5B:
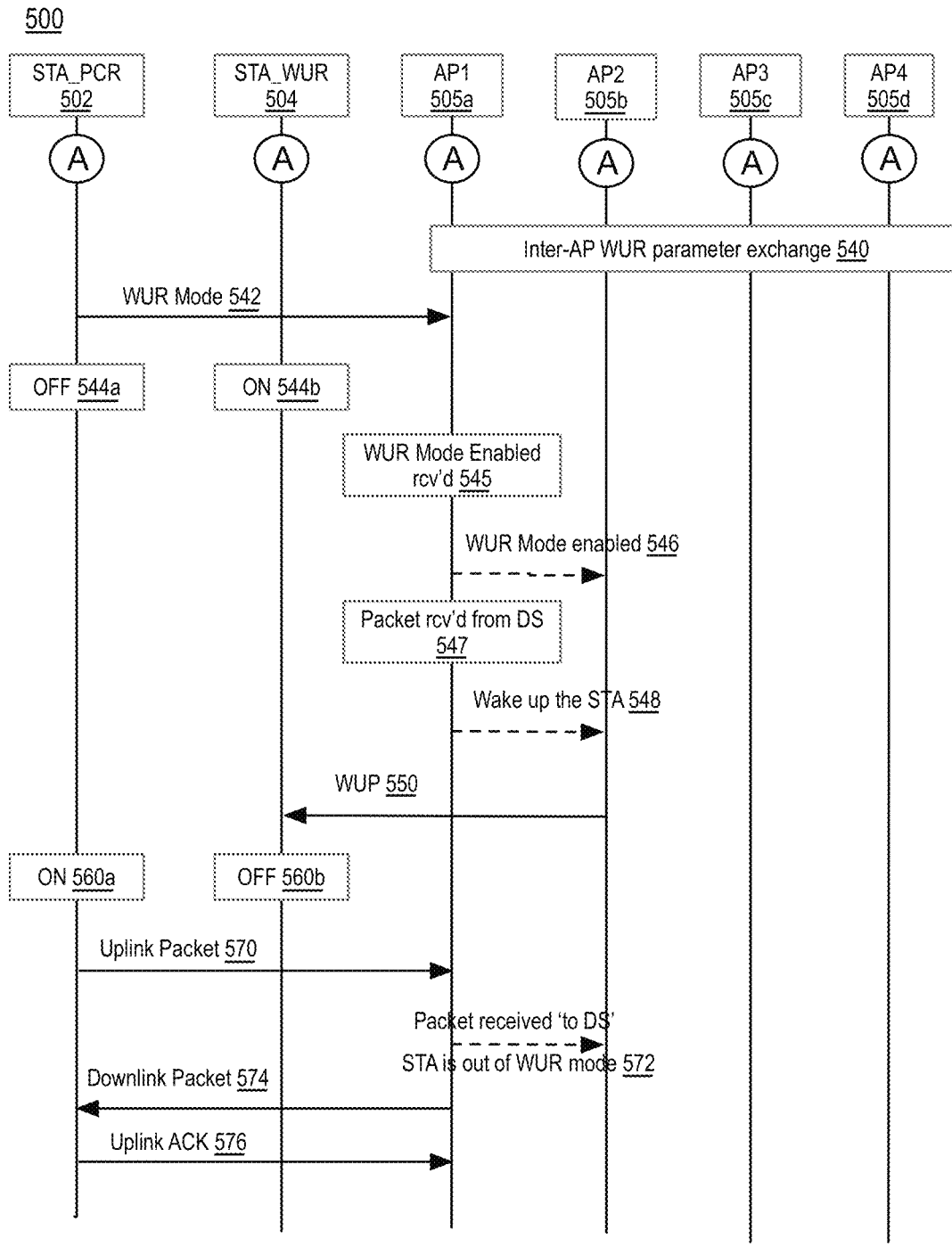

FIGS. 5A and 5B depict an example schematic flow 500 of DFS for WUR in a communication deployment according to some embodiments. In one implementation, flow 500 is a time flow diagram of events in the deployment of system architecture 400 depicted in FIG. 4. Flow 500 includes events occurring between the components of system architecture 400 including, but not limited to, station 410, AP1, 420a, AP2, 420b, AP3, 420c, and AP4, 420d. The PCR of station 410 is illustrated as STA_PCR 502 in flow 500. The WUR of station 410 is illustrated as STA_WUR 504 in flow 500. Similarly, AP1 420a is AP1 505a, AP2 420b is AP2 505b, AP3 420c is AP3 505c, and AP4 420d is AP4 505d in flow 500. Other components may also be included in flow 500 and implementations of the disclosure are not limited to the specific deployment depicted herein.

Continuing with the example system architecture 400 described with respect to FIG. 4, the STA 410 (with the PCR 502 and WUR 504 capability) follows a series of communications in order to associate with AP1 505a. Initially, the STA_PCR 502 of the station is turned on 521a and the STA_WUR of the station is turned off 521b. As a part of the discovery/scanning/association process the STA_PCR 502 probes on different channels. Assume that AP1 505a, AP2 505b, and AP3 505c receive probes 522a, 522b, 524a, 524b, 526a, 526b, while AP4 505d does not receive a probe. STA_PCR 502 selects AP1 505a to associate with and STA_PCR 502 and AP1 505a perform an authentication and association process with a 4-way key handshake, for example to complete the association between the two components.

After association 528, AP1 505a receives a Virtual Beacon Report (VBR)/Radio Neighbor Report (RNR) through any in-band or out-of-band mechanism for the STA 410. The VBR/RNR, in essence, includes the list of APs which heard the probe requests from the STA. This VBR/RNR includes AP2 505b and AP3 505c in it. Thus, as part 1 510 of a surrogate WUR-AP selection process, AP1 505a can remove AP4 505d from a surrogate list of APs it maintains. In one implementation, AP1 505a can maintain the surrogate list of APs in a WUR surrogate data store 308 maintained by control circuitry 306 of the AP 300, 420a, 505a.

As part 2 520 of the surrogate WUR-AP selection process, AP1 505a may then select the 5 GHz radio on AP2 505b to be the surrogate 5 GHz radio. This selection of AP2's 505b 5 GHz radio can be from the surrogate list of APs maintained by AP1 505a, which may include a list of the following radios: AP2:2.4 GHz; AP2:5 GHz; AP3:2.4 GHz. The selection of AP2's 505b 5 GHZ radio from among the candidate list of radios of the candidate APs can be based off multiple criteria. In one implementation, one of the criteria includes a strength of signal of the radio. The VBR/RNR provided to AP1 420a may include the strength of signals from each AP 420b-420d (e.g., the AP with the strongest signal would be selected). In one implementation, one of the criteria includes a number of APs that the particular AP acts as a surrogate for (e.g., an AP with the least number of APs it acts as a surrogate for would be selected). Other criteria may also be utilized in part 2 520 of the surrogate WUR-AP selection process. Furthermore, multiple criteria may be simultaneously considered for the surrogate WUR-AP selection process.

In one implementation, part 2 520 of the Surrogate WUR-AP selection process can be executed at any point in the flow 500 and may be dependent on the parameters considered for the AP selection.

The STA_PCR 502 may then negotiate 530 the WUR mode operation with the AP (e.g., AP1 505a) to which it associates. The WUR negotiation 530 may involve deciding the channel for the STA_WUR 504 to receive the WUP on (this is the channel on which the surrogate AP (e.g., AP2 505b) is to send the WUP), the WID assigned to the STA, and so on. After the operational parameters are negotiated 530 with AP1 505a, AP1 exchanges those with AP2 at the inter-AP WUR parameter exchange 540.

After an indeterminate time, the STA_PCR 502 tells the AP1 505a that it is going into the WUR mode 542 (e.g., doze state). The station then shuts off 544a its STA_PCR 502 and turns on 544b its STA_WUR 504. A confirmation that the WUR mode is enabled is received 545 at AP1 505a from the station. AP1 505a then notifies 546 AP2 505b that the station is currently in WUR mode.

When a frame for the station (including STA_PCR 502 and STA_WUR 504) arrives 547 on the distribution system at AP1 505a, AP1 505a sends 548 a message to AP2 505b to wake up the STA_WUR 504. AP2 505b sends a WUP 550 on the channel that was previously conveyed to it by AP1 505a via the inter-AP WUR parameter exchange 540. Also, as previously discussed, AP1 505a may also send 548 a message to AP2 505b to wake up STA_WUR 504 in response to an operational change to the BSS parameters at AP1 505a.

In response to the WUP 550, the STA_WUR 504 is switched off 560b and the STA_PCR 502 is switched on 560a. The STA_PCR 502 continues its operation as a normal 802.11 station as depicted by downlink packet 574 and uplink acknowledgment (ACK) 576 communications. In response to the AP1 505a receiving 570 a frame on the uplink (UL) from the STA_PCR 502, the AP1 505a notifies 572 AP2 505b of the received frame. AP2 505b can take corresponding action (e.g., cleaning up the state of the STA from a WUR perspective, etc.). AP1 505 can also, at this stage, take other actions like executing Part 2 520 of the Surrogate WUR AP selection process to select another surrogate AP.

In one implementation, the example flow 500 shown in FIGS. 5A-5B can be sent in part or in whole over different media (wired or wireless) and can also be sent in part or in whole over a tunneled interface formed at any layer in the TCP/IP stack.

FIG. 6 is a flow chart to illustrate a process 600 for DFS for WUR in some embodiments. In one embodiment, the process 600 may be performed by WUR surrogate component 205, 305 described with respect to FIGS. 2 and 3. In some embodiments, a process to provide DFS for WUR in an AP includes the following:

In some implementations, the AP, which is referred to as a primary AP, may select a surrogate AP to communicate with a wake up radio of a station 610. In one implementation, the station is associated with the primary AP operating on an 802.11 DFS channel 610. In one implementation, the surrogate AP is operating on a non-DFS channel. The primary AP may provide, to the surrogate AP, wake up radio parameters negotiated between the station and the primary AP 620.

In some implementations, the primary AP may cause the surrogate AP to send a wake up signal to the station 630. In one implementation, the wake up signal causes the wake up radio of the station to enable a primary connectivity radio of the station. The primary AP may exchange data with the station via the primary connectivity radio after the primary connectivity radio is enabled 640.

Figure 7:
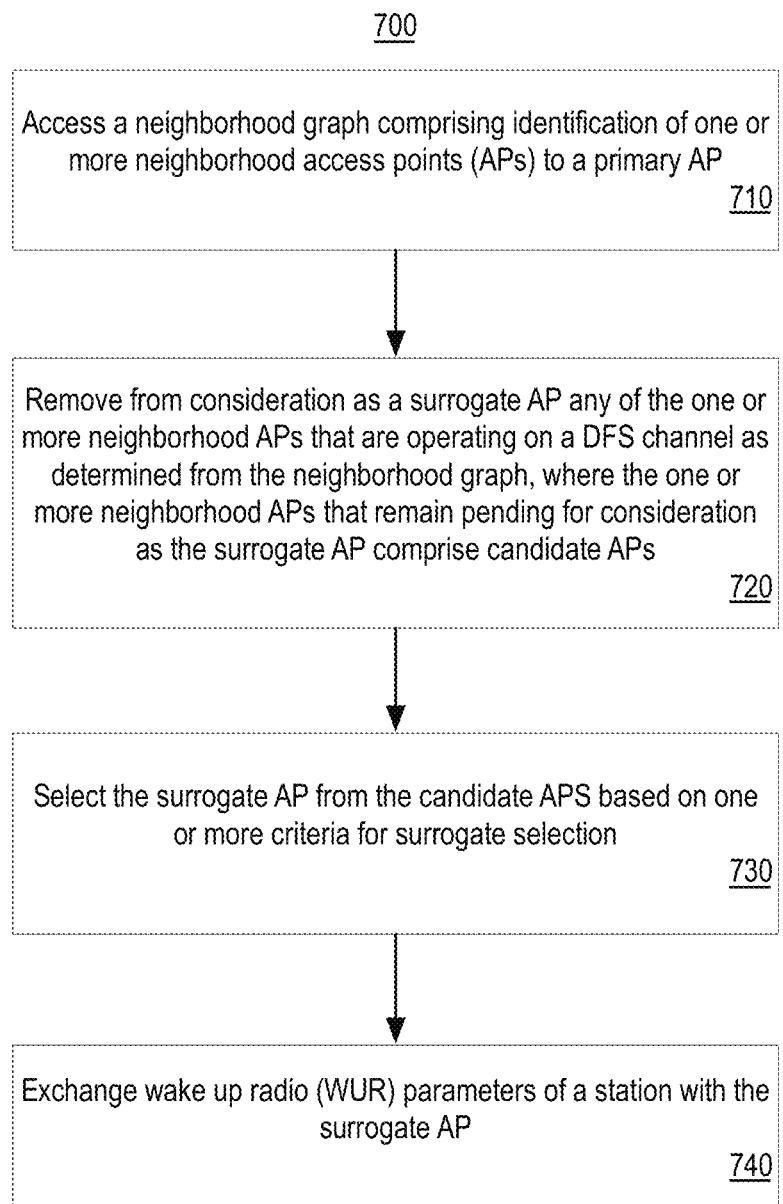
FIG. 7 illustrates operations for a surrogate AP selection process for DFS for WUR, according to some embodiments.

FIG. 7 is a flow chart to illustrate a process 700 for surrogate selection in DFS for WUR according to some embodiments. In one embodiment, the process 700 may be performed by WUR surrogate component 205, 305 described with respect to FIGS. 2 and 3. In some embodiments, a process to provide for surrogate selection in DFS for WUR by the AP includes the following:

In some embodiments, the AP, which is referred to as a primary AP, may access a neighborhood graph comprising identification of one or more neighborhood APs to a primary AP 710. The primary AP may Remove from consideration as a surrogate AP any of the one or more neighborhood APs that are operating on a DFS channel as determined from the neighborhood graph 720. In one implementation, the one or more neighborhood APs that remain pending for consideration as the surrogate AP include candidate APs.

In one implementation, the primary AP may select the surrogate AP from the candidate APS based on one or more criteria for surrogate selection 730. The primary AP may exchange WUR parameters of a station with the surrogate AP 740.

Figure 8:
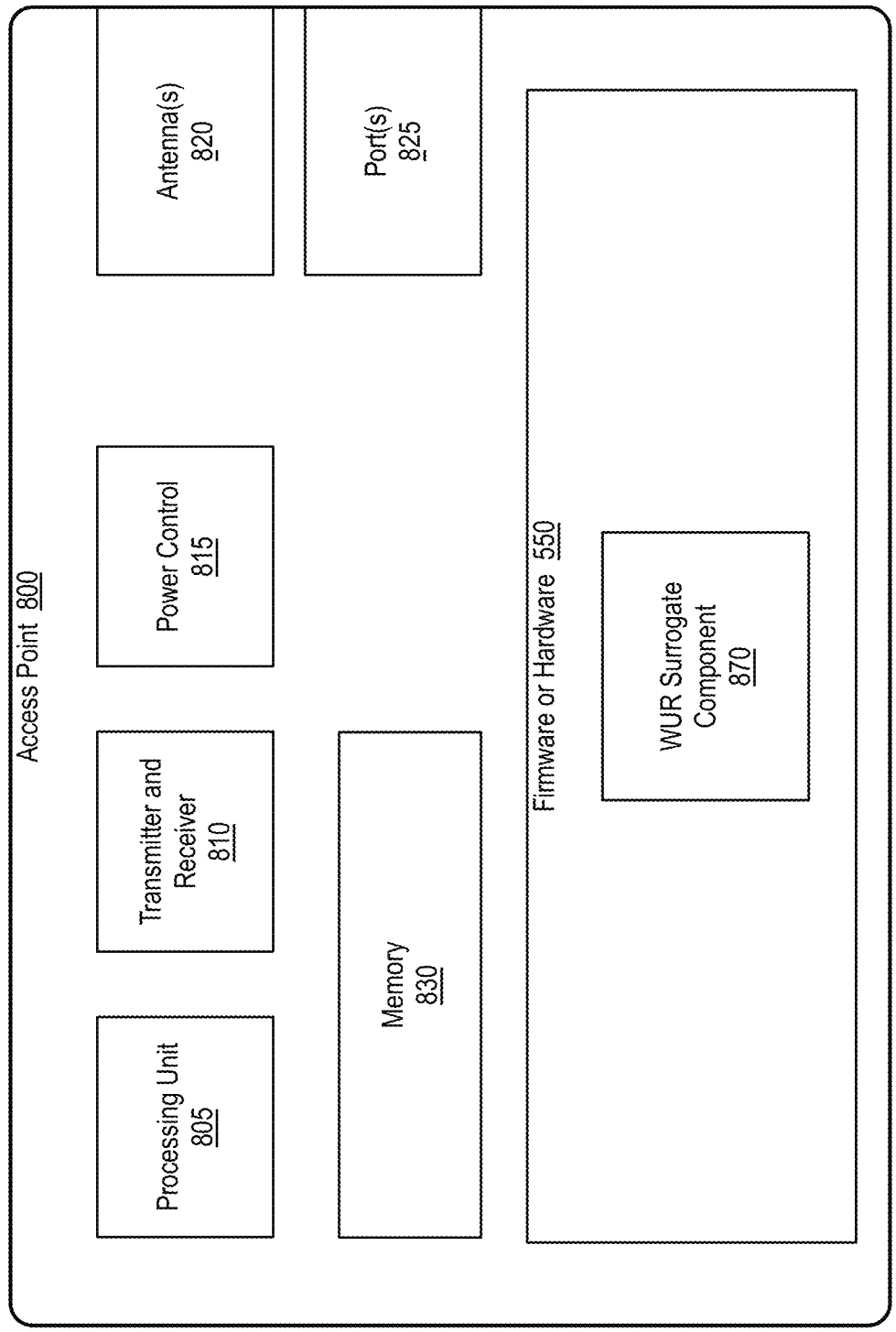
FIG. 8 is block diagram to illustrate an access point to provide Wi-Fi transmission or reception for DFS for WUR according to some embodiments.

FIG. 8 is block diagram to illustrate an access point to provide Wi-Fi transmission or reception for DFS for WUR, according to some embodiments. An access point includes additional components and elements not illustrated in FIG. 8, which is simplified for sake of illustration. The illustrated Wi-Fi transmitter or receiver 800 may include an AP operating under one or more IEEE 802.11 standards, such as AP 202 or AP 222 illustrated in FIG. 2.

In some embodiments, the Wi-Fi transmitter or receiver 800 includes a processing unit 805, a transmitter and/or receiver 810, power control 815, and one or more antennas 820 for wireless signal communication. In some embodiments, the one or more antennas 820 include at least one of a pair of co-located polarized transmission antennas for a Wi-Fi transmitter or a uniform linear array of antennas for a Wi-Fi receiver. The Wi-Fi transmitter or receiver 800 may further include one or more ports 825 for network connections or other connections, and a memory 830 for storage of data, which may include volatile and nonvolatile memory (including flash memory and similar elements), registers, and other storage technologies.

In some embodiments, the Wi-Fi transmitter or receiver 800 may further includes firmware or hardware or both 850 including a WUR surrogate component 870 (may also be referred to herein as WUR surrogate component code) to provide DFS for WUR, such as illustrated in FIGS. 1-7.

Figure 9:
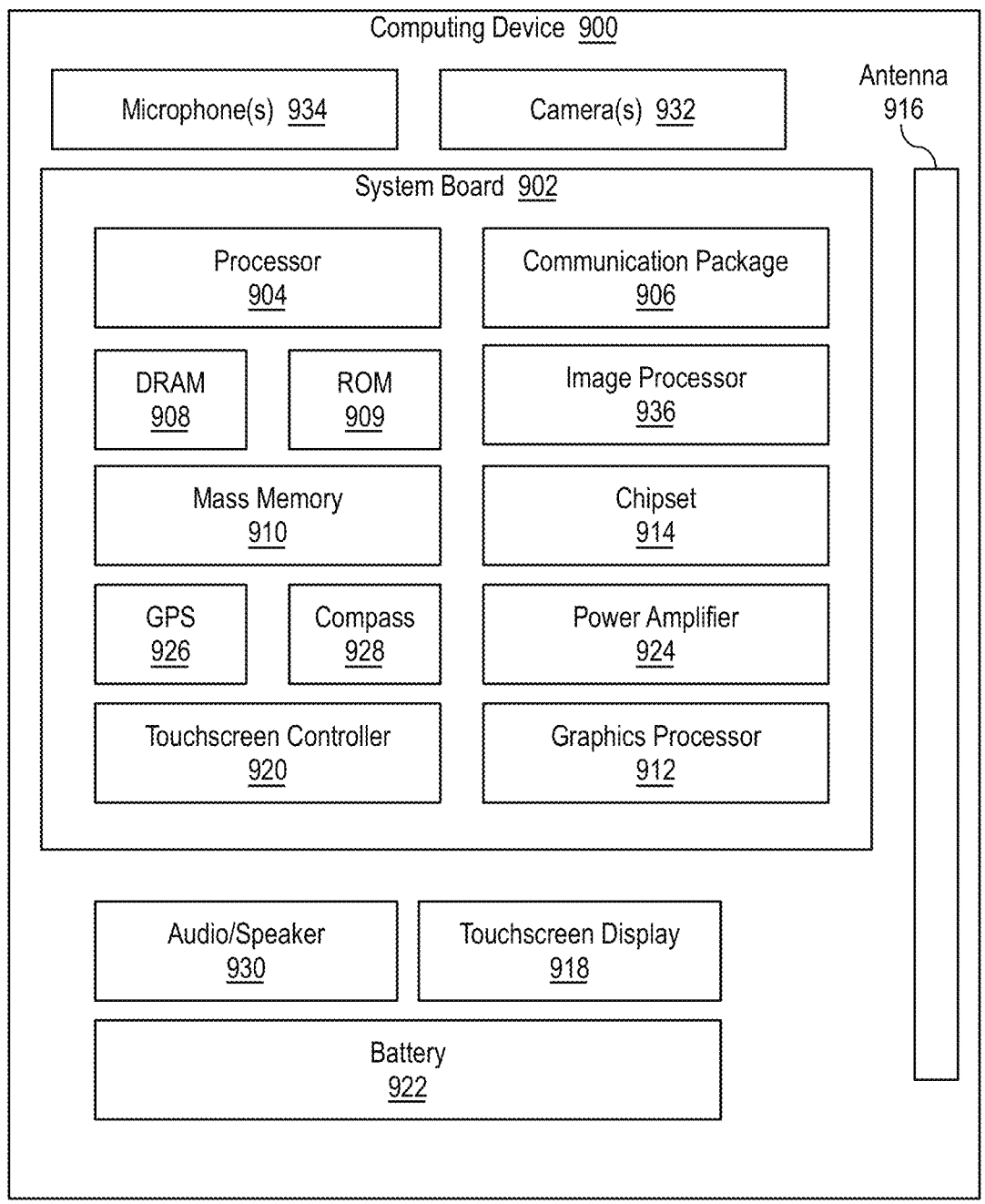
FIG. 9 illustrates components of a computing device according to some embodiments.

FIG. 9 illustrates a computing device 900 according to some embodiments. In some embodiments, the computing device 900 may include a device to communicate with an AP in network, such as AP 202 or AP 222 described with respect to FIG. 2. In some embodiments, computing device 900 may include an AP providing a DFS for WUR, such as AP 202 described with respect to FIG. 2. Computing device 900 houses a system board 902 (which may also be referred to as a motherboard, main circuit board, or other terms). The board 902 may include a number of components, including but not limited to a processor 904 and at least one communication package or chip 906. The communication package 906 is coupled to one or more antennas 916. The processor 904 is physically and electrically coupled to the board 902.

Depending on its applications, computing device 900 may include other components that may or may not be physically and electrically coupled to the board 902. These other components include, but are not limited to, volatile memory (e.g., DRAM) 908, nonvolatile memory (e.g., ROM) 909, flash memory (not shown), a graphics processor 912, an image processor 936, a digital signal processor (not shown), a crypto processor (not shown), a chipset 914, an antenna 916, a display 918 such as a touchscreen display, a touchscreen controller 920, a battery 922, an audio codec (not shown), a video codec (not shown), a power amplifier 924, a global positioning system (GPS) device 926, a compass 928, an accelerometer (not shown), a gyroscope (not shown), a speaker or other audio element 930, one or more cameras 932, a microphone array 934, and a mass storage device (such as hard disk drive) 910, compact disk (CD) (not shown), digital versatile disk (DVD) (not shown), and so forth). These components may be connected to the system board 902, mounted to the system board, or combined with any of the other components.

The communication package 906 enables wireless and/or wired communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 906 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 900 may include a plurality of communication packages 906. For instance, a first communication package 906 may be dedicated to shorter range wireless communications such as Wi-Fi and Bluetooth and a second communication package 906 may be dedicated to longer range wireless communications such as GSM, EDGE, GPRS, CDMA, WiMAX, LTE, Ev-DO, and others.

In various implementations, the computing device 900 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 900 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium (or machine-readable storage medium or non-transitory machine-readable storage medium), such as a non-transitory machine-readable medium, including instructions that, when performed by a machine, cause the machine to perform acts of the method, or of an apparatus or system for facilitating operations according to embodiments and examples described herein.

In some embodiments, an access point includes a processor; a transmitter and receiver for Wi-Fi communication; and firmware including dynamic threshold adaptation code to provide dynamic threshold adaptation for dynamic frequency selection (DFS), wherein the access point is to: estimate a duty time of transmission of wireless signals, the wireless signals being communicated on a Dynamic Frequency Selection (DFS) channel of the access point; adapt, based at least in part on the duty time of transmission, a threshold of radar signals to indicate detection of a radar signal at the access point on the DFS channel; and perform analysis of received wireless signals on the DFS channel at the access point to detect the radar signal using the adapted threshold of radar signals.

In some embodiments, one or more non-transitory computer-readable storage mediums have stored thereon executable computer program instructions that, when executed by one or more processors, cause the one or more processors to perform operations including estimating a duty time of transmission of wireless signals by an access point, the access point to provide Wi-Fi communication, the wireless signals being communicated on a Dynamic Frequency Selection (DFS) channel of the access point; adapting, based at least in part on the duty time of transmission, a threshold of radar signals to indicate detection of a radar signal at the access point on the DFS channel; and performing analysis of received wireless signals on the DFS channel at the access point to detect the radar signal using the adapted threshold of radar signals.

In some embodiments, method for a dynamic radar detection threshold for stateful dynamic frequency selection (DFS) includes estimating a duty time of transmission of wireless signals by an access point, the access point to provide Wi-Fi communication, the wireless signals being communicated on a Dynamic Frequency Selection (DFS) channel of the access point; adapting, based at least in part on the duty time of transmission, a threshold of radar signals to indicate detection of a radar signal at the access point on the DFS channel; and performing analysis of received wireless signals on the DFS channel at the access point to detect the radar signal using the adapted threshold of radar signals.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A non-transitory machine-readable storage medium encoded with instructions executable by a hardware processor of a computing component of a device, the machine-readable storage medium comprising instructions to cause the hardware processor to:

access a neighborhood graph comprising identification of one or more neighbor access points (APs) to a primary AP;

remove from consideration as a surrogate AP any of one or more neighborhood APs that are operating on a DFS channel as determined from the neighborhood graph, wherein the one or more neighborhood APs that remain pending for consideration as the surrogate AP comprise candidate APs;

select, by the hardware processor of the AP, a surrogate AP to communicate with a wake up radio of a station that is associated with the primary AP operating on an 802.11 Dynamic Frequency Selection (DFS) channel, where the surrogate AP is operating on a non-DFS channel, wherein the surrogate AP is selected from the candidate APs based on one or more criteria for surrogate selection;

provide, by the primary AP to the surrogate AP, wake up radio parameters negotiated between the station and the primary AP;

cause, by the primary AP, the surrogate AP to send a wake up signal to the station, the wake up signal to cause the wake up radio of the station to enable a primary connectivity radio of the station; and exchange, by the primary AP, data with the station via the primary connectivity radio after the primary connectivity radio is enabled.

2. The non-transitory machine-readable storage medium of claim 1, wherein the one or more criteria comprise a strength of signal among the candidate APs.

3. The non-transitory machine-readable storage medium of claim 1, wherein the one or more criteria comprise a number of stations that each of the candidate APs are assigned as a surrogate.

4. The non-transitory machine-readable storage medium of claim 1, wherein the instructions to cause the surrogate AP to send a wake up signal to the station are in response to the primary AP receiving a packet destined for the station.

5. The non-transitory machine-readable storage medium of claim 1, wherein the instructions to cause the surrogate AP to send a wake up signal to the station are in response to an operational change to the basic service set (BSS) parameters of the primary AP.

6. The non-transitory machine-readable storage medium of claim 1, wherein the instructions to further cause the hardware processor to receive a wake up radio (WUR) mode notification from the station that the station is entering a WUR mode.

7. The non-transitory machine-readable storage medium of claim 6, wherein the instructions to further cause the hardware processor to notify, in response to receiving the WUR mode notification, the surrogate AP to be on standby for sending the wake up signal.

8. The non-transitory machine-readable storage medium of claim 6, wherein the instructions to further cause the hardware processor to receive a packet destined for the station while the station is in the WUR mode, and wherein causing the surrogate AP to send the wake up signal is in response to receiving the packet destined for the station.

9. The non-transitory machine-readable storage medium of claim 1, wherein the instructions to further cause the hardware processor to notify, in response to exchanging the data with the station via the primary connectivity radio, the surrogate AP that the wake up signal sent to the station was successful.

10. The non-transitory machine-readable storage medium of claim 1, wherein the primary AP and the surrogate AP are the same AP comprising a first 5 GHz radio operating on the DFS channel and a second 5 GHz radio operating on the non-DFS channel.

11. A method comprising:
accessing a neighborhood graph comprising identification of one or more neighbor access points (APs) to a primary AP;
removing from consideration as a surrogate AP any of one or more neighborhood APs that are operating on a DFS channel as determined from the neighborhood graph, wherein the one or more neighborhood APs that remain pending for consideration as the surrogate AP comprise candidate APs;
selecting, by a hardware processor of the primary AP, a surrogate AP to communicate with a wake up radio of a station that is associated with the primary AP operating on an 802.11 Dynamic Frequency Selection (DFS) channel, where the surrogate AP is operating on a non-DFS channel, wherein the surrogate AP is selected from the candidate APs based on one or more criteria for surrogate selection;
providing, by the primary AP to the surrogate AP, wake up radio parameters negotiated between the station and the primary AP;
causing, by the primary AP, the surrogate AP to send a wake up signal to the station in response to the primary AP receiving a packet destined for the station, the wake up signal to cause the wake up radio of the station to enable a primary connectivity radio of the station; and
exchanging, by the primary AP, data with the station via the primary connectivity radio after the primary connectivity radio is enabled.

12. The method of claim 11, wherein the one or more criteria comprise at least one of a strength of signal among the candidate APs or a number of stations that each of the candidate APs are assigned as a surrogate.

13. The method of claim 11, further comprising:
receiving a wake up radio (WUR) mode notification from the station that the station is entering a WUR mode; and
notifying, in response to receiving the WUR mode notification, the surrogate AP to be on standby for sending the wake up signal.

14. The method of claim 11, further comprising receiving a packet destined for the station while the station is in the WUR mode, wherein causing the surrogate AP to send the wake up signal is in response to receiving the packet destined for the station.

15. A primary access point (AP) comprising:
a processor;
a transmitter and receiver for Wi-Fi communication; and
firmware including wake up radio (WUR) surrogate code to provide dynamic frequency selection (DFS) for WUR, wherein the primary AP is to:
access a neighborhood graph comprising identification of one or more neighbor access points (APs) to the primary AP;
remove from consideration as a surrogate AP any of one or more neighborhood APs that are operating on a DFS channel as determined from the neighborhood graph, wherein the one or more neighborhood APs that remain pending for consideration as the surrogate AP comprise candidate APs;
select a surrogate AP to communicate with a wake up radio of a station that is associated with the primary AP operating on an 802.11 Dynamic Frequency Selection (DFS) channel, where the surrogate AP is operating on a non-DFS channel, wherein the surrogate AP is selected from the candidate APs based on one or more criteria for surrogate selection;
provide, to the surrogate AP, wake up radio parameters negotiated between the station and the primary AP;
cause the surrogate AP to send a wake up signal to the station in response to the primary AP receiving a packet destined for the station, the wake up signal to cause the wake up radio of the station to enable a primary connectivity radio of the station; and
exchange data with the station via the primary connectivity radio after the primary connectivity radio is enabled.

16. The primary AP of claim 15, wherein the one or more criteria comprise at least one of a strength of signal among the candidate APs or a number of stations that each of the candidate APs are assigned as a surrogate.

17. The primary AP of claim 15, wherein the primary AP is further to:
receive a wake up radio (WUR) mode notification from the station that the station is entering a WUR mode; and
notify, in response to receiving the WUR mode notification, the surrogate AP to be on standby for sending the wake up signal.

* * * * *